(12) United States Patent
Walker et al.

(10) Patent No.: US 8,037,510 B2
(45) Date of Patent: Oct. 11, 2011

(54) TECHNIQUES FOR NEGOTIATION OF SECURITY POLICIES IN WIRELESS MESH NETWORKS

(75) Inventors: Jesse Walker, Portland, OR (US); Meiyuan Zhao, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1057 days.

(21) Appl. No.: 11/857,349

(22) Filed: Sep. 18, 2007

(65) Prior Publication Data
US 2008/0069351 A1   Mar. 20, 2008

Related U.S. Application Data

(60) Provisional application No. 60/845,631, filed on Sep. 18, 2006.

(51) Int. Cl.
*G06F 7/04* (2006.01)
*G06F 17/30* (2006.01)
(52) U.S. Cl. .................. 726/2; 380/227; 380/46
(58) Field of Classification Search .............. 380/46, 380/277; 726/2
See application file for complete search history.

(56) References Cited

U.S. PATENT DOCUMENTS

| | | | |
|---|---|---|---|
| 7,489,645 B2 * | 2/2009 | Simon et al. | 370/254 |
| 2007/0121947 A1 * | 5/2007 | Sood et al. | 380/277 |
| 2007/0162751 A1 * | 7/2007 | Braskich et al. | 713/169 |
| 2007/0189249 A1 * | 8/2007 | Gurevich et al. | 370/338 |
| 2008/0065884 A1 * | 3/2008 | Emeott et al. | 713/168 |
| 2008/0065888 A1 * | 3/2008 | Zheng et al. | 713/171 |

OTHER PUBLICATIONS

Maughan, et al., "Internet Security Association and Key Management Protocol (ISAKMP)", draft-ietf-ipsecisakmp-07.txt.ps, Feb. 21, 1997, 77 pgs.
PCT Search Report for PCT/US2007/078808 mailed Mar. 14, 2008, 10 pgs.
Notice of Preliminary Rejection for Korean Patent Application No. 10-2009-7004379 mailed Jun. 17, 2010, 10 pgs.

* cited by examiner

*Primary Examiner* — Kambiz Zand
*Assistant Examiner* — Benjamin Kaplan
(74) *Attorney, Agent, or Firm* — Blakely, Sokoloff, Taylor & Zafman LLP

(57) ABSTRACT

Techniques to overlay ciphersuite negotiation on top of the mesh link establishment protocol without sacrificing security. Two cryptographic primitives may be utilized: (1) a message integrity code, which is denoted as $m_K$, where K is an authentication key ($m_K$ may be utilized to detect forged messages); and (2) a cryptographic random number generator, which will be denoted as rng. The techniques may use rng to produce values that cannot be predicted by any polynomial time algorithm.

8 Claims, 3 Drawing Sheets

TECHNIQUES FOR NEGOTIATION OF SECURITY POLICIES IN WIRELESS MESH NETWORKS

This application claims the benefit of U.S. Provisional Application No. 60/845,631 filed Sep. 18, 2006.

TECHNICAL FIELD

Embodiments of the invention relate to wireless communications. More particularly, embodiments of the invention relate to security in wireless mesh networks.

BACKGROUND

IEEE 802.11s is an amendment being developed to the IEEE 802.11 standard that, when completed, is intended to provide protocols to add mesh capabilities to the wireless local area network (WLAN) standard. The mesh architectures allow the data to be forwarded on paths consisting of multiple wireless hops. IEEE 802.11s was chartered to improve the throughput of data transmission by adding the mesh capabilities without compromising security and without degrading quality of service (QoS) across transitions. One of the advantages that may result from this amendment is ability to provide video streaming over the mesh network.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Video stream distribution imposes constraints on mesh network design in that peer links on the mesh must be established regardless of noise on Wi-Fi media. There has been concern as to whether the secure peer link establishment process can complete in a short enough time frame to meet the constraints imposed by video stream distribution.

One technique is to expedite the procedure of establishing secure peer links by overlaying security handshake on top of the basic peer link establishment protocol. This scheme may permit the Wireless LAN Mesh Points (MPs) to omit certain steps in the secure link establishment process if they have priori knowledge and control of a previously established Pairwise Master Key (PMK). This approach is believed to enhance the user experience of video stream applications on the mesh given that MPs may lose connectivity on certain links frequently.

The 802.11s security enhancement of peer link establishment protocol introduces new security problems and performance challenges. The first step of the protocol is to negotiate the security policy, in particular the cryptographic algorithms, to enable unicast/multicast mesh traffic protection. Such algorithms are typically referred to as ciphersuites. Both mesh points agree on the ciphersuite to use for the link instance between them, before they can complete the peer link establishment procedure.

In IEEE 802.11i, the security amendment to IEEE 802.11, the ciphersuite negotiation is done using a client/server model, where the WLAN Access Point (AP) advertises a list of ciphersuites and the WLAN station (STA) chooses a ciphersuite it can support from the list. A WLAN mesh uses the peer-to-peer model to establish links, meaning the agreement method used by the client-server model is unreliable unless the number of messages exchanged during link establishment is proportional to the length of the list.

Figure 1:
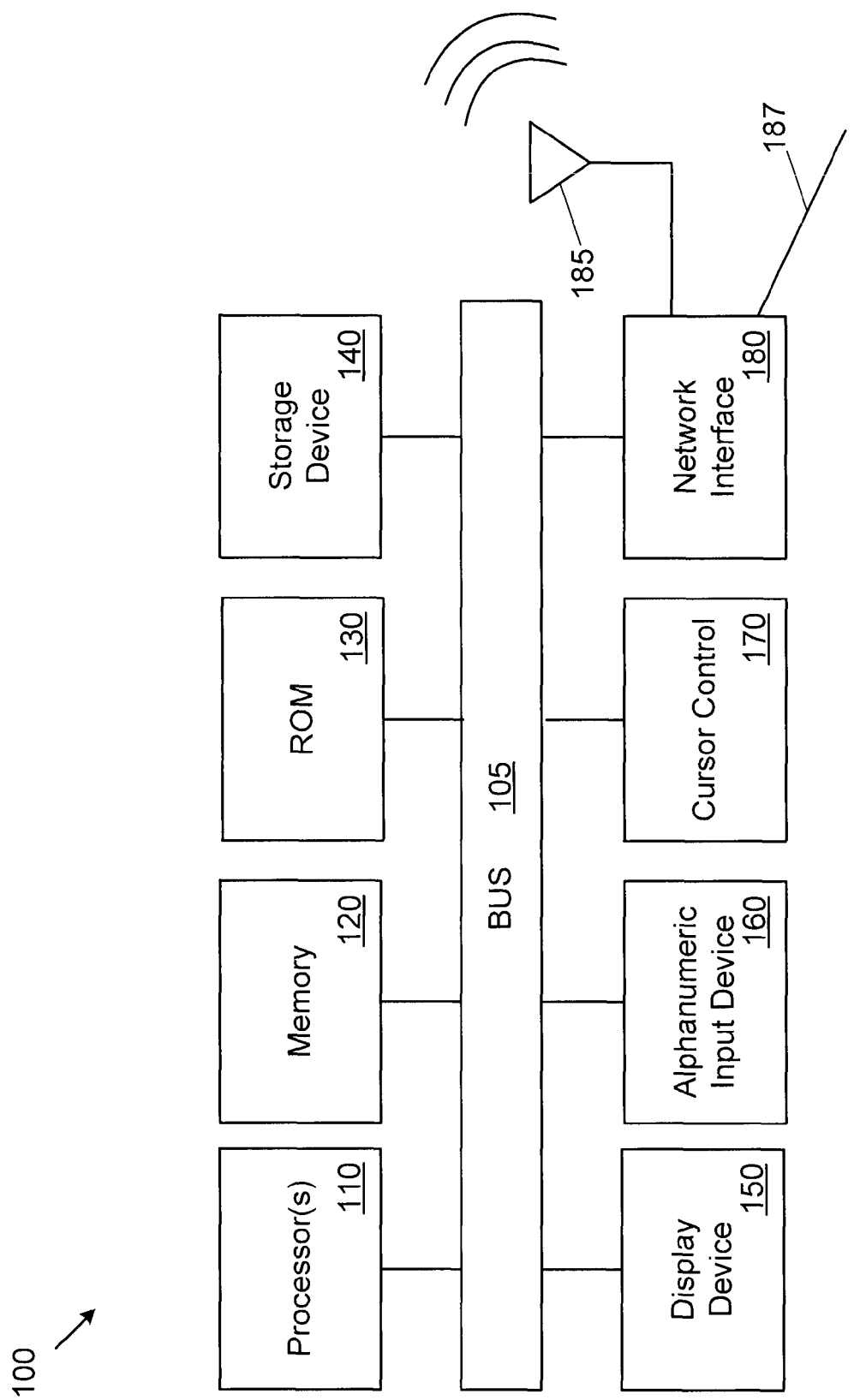
FIG. 1 is a block diagram of one embodiment of an electronic system.

Each mesh point of a mesh network may be an electronic system. FIG. 1 is a block diagram of one embodiment of an electronic system. The electronic system illustrated in FIG. 1 is intended to represent a range of electronic systems (either wired or wireless) including, for example, desktop computer systems, laptop computer systems, cellular telephones, personal digital assistants (PDAs) including cellular-enabled PDAs, set top boxes. Alternative electronic systems may include more, fewer and/or different components.

Electronic system 100 includes bus 105 or other communication device to communicate information, and processor 110 coupled to bus 105 that may process information. While electronic system 100 is illustrated with a single processor, electronic system 100 may include multiple processors and/or co-processors. Electronic system 100 further may include random access memory (RAM) or other dynamic storage device 120 (referred to as main memory), coupled to bus 105 and may store information and instructions that may be executed by processor 110. Main memory 120 may also be used to store temporary variables or other intermediate information during execution of instructions by processor 110.

Electronic system 100 may also include read only memory (ROM) and/or other static storage device 130 coupled to bus 105 that may store static information and instructions for processor 110. Data storage device 140 may be coupled to bus 105 to store information and instructions. Data storage device 140 such as a magnetic disk or optical disc and corresponding drive may be coupled to electronic system 100.

Electronic system 100 may also be coupled via bus 105 to display device 150, such as a cathode ray tube (CRT) or liquid crystal display (LCD), to display information to a user. Alphanumeric input device 160, including alphanumeric and other keys, may be coupled to bus 105 to communicate information and command selections to processor 110. Another type of user input device is cursor control 170, such as a mouse, a trackball, or cursor direction keys to communicate direction information and command selections to processor 110 and to control cursor movement on display 150.

Electronic system 100 further may include network interface(s) 180 to provide access to a network, such as a local area network. Network interface(s) 180 may include, for example, a wireless network interface having antenna 185, which may represent one or more antenna(e). Network interface(s) 180 may also include, for example, a wired network interface to communicate with remote devices via network cable 187, which may be, for example, an Ethernet cable, a coaxial cable, a fiber optic cable, a serial cable, or a parallel cable.

In one embodiment, network interface(s) 180 may provide access to a local area network, for example, by conforming to IEEE 802.11 standards, and/or the wireless network interface may provide access to a personal area network, for example, by conforming to Bluetooth® standards. Bluetooth® is a registered trademark owned by Bluetooth SIG, Inc. Other wireless network interfaces and/or protocols can also be supported.

IEEE 802.11 standards may include, for example, IEEE 802.11b, IEEE 802.11g as well as other IEEE 802.11 standards no specifically mentioned herein. IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1, " published Feb. 22, 2001 by the Bluetooth Special Interest Group, Inc. Associated as well as previous or subsequent versions of the Bluetooth standard may also be supported.

Described herein are overlays for the ciphersuite negotiation on top of the mesh four message link establishment protocol without sacrificing security. In one embodiment, two cryptographic primitives may be utilized: (1) a message integrity code, which is denoted as $m_K$, where K is an authentication key ($m_K$ may be utilized to detect forged messages); and (2) a cryptographic random number generator, which will be denoted as rng. The techniques described herein may use rng to produce values that cannot be predicted by any polynomial time algorithm. ANSI standards X9.31 and X9.82 provide examples of cryptographic random number generators. Examples of message authentication codes include AES in CMAC mode, and SHA-256 in HMAC mode.

The link may be established between two points in a mesh network. A mesh point, which will also be referred to as mesh point A. Mesh point A has an associated identifier, which will be denoted as MPA. The IEEE 802.11 MAC address of A is a suitable value for MPA, but any other unique identifier will do. Another mesh point, which will be referred to as mesh point B. Mesh point B has an identifier, which will be denoted as MPB. The IEEE 802.11 MAC address of B is a suitable value for MPB, but any other unique identifier will do.

In one embodiment, mesh point A may maintain the following: (1) A list of acceptable ciphersuite $L_A$ (This list may contain the ciphersuites $C_{A1}, C_{A2}, \ldots, C_{AN}$ that mesh point A supports for unicast/multicast mesh traffic protection, where N is the length of $L_A$), and (2) A unique authentication key K that A shares with mesh point B, which is used to key the message authentication code $m_K$ (this authentication key K allows the mesh point A to detect messages forged by devices masquerading as the mesh point B). Mesh point A may utilize MPA to identify K to mesh point B.

In one embodiment, mesh point B may maintain the following: (1) A list of acceptable ciphersuite $L_B$ (this list contains the ciphersuites $C_{B1}, C_{B2}, \ldots, C_{BM}$ that mesh point B supports for unicast/multicast mesh traffic protection, where M is the length of $L_B$), and (2) The authentication key K shared with the mesh point A, which is used to key the message authentication code $m_K$ (this authentication key K allows the mesh point B to detect messages forged by devices masquerading as the mesh point A). Mesh point B may utilize MPB to identify K to mesh point A.

This description that follows assumes that the authentictaion key K shared between mesh point A and mesh point B is established in some secure fashion, and is bound to the MAC addresses of each party. That is, it assumes that both A and B know that K is used for protecting messages exchanged between devices using their own identifiers. Configuration may be accomplished in any manner known in the art. The description also assumes that the acceptable ciphersuites supported by each mesh point are configured to the mesh point prior to the execution of the security policy negotiation may be accomplished in any manner known in the art.

The description further assumes the basic peer link establishment protocol exists that establishes the peer link between mesh point A and mesh point B using Request and Response message exchanges. Both mesh points can initiate the protocol independently. There are at least four message exchanged during the protocol execution. In the end, the peer link is established between mesh point A and mesh point B. The description further assumes that IEEE 802.11 MAC addresses are ordered lexicographically, and that mesh point A has a larger MAC address in the ordering than B. Because the MAC address can be used to uniquely identify a wireless device, one mesh point's MAC address will also be strictly larger than the other's with respect to the lexicographical order.

Figure 2:
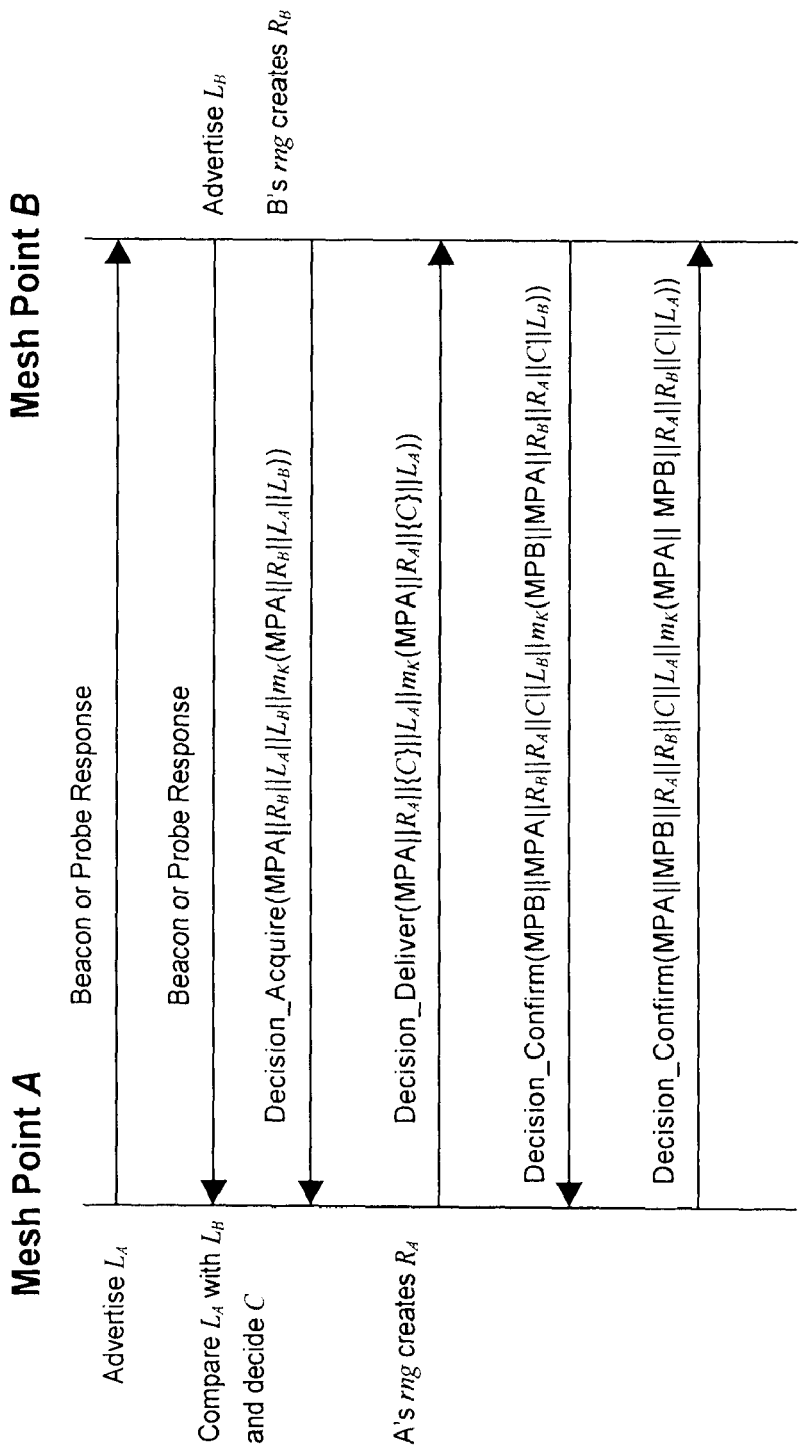
FIG. 2 illustrates one embodiment of a technique for security policy negotiation in a mesh network.

The technique described herein may operate in two phases. In phase 1, both mesh points advertise their configured ciphersuite list to each other and mesh point A makes the decision on the ciphersuite to be used for the link. In phase 2, mesh point A and mesh point B communicate and confirm the decision using the Request message in the peer link establishment protocol. The technique is graphically illustrated in FIG. 2.

In the first phase mesh point A and mesh point B broadcast Beacons and unicast Probe Responses advertising the configuration parameters for secure communication, using the same approach as defined in IEEE 802.11i. Mesh point A includes $L_A$ in the message and mesh point B includes $L_B$ in the message. When mesh point A receives $L_B$, it may establish a secure link with mesh point B. Because it has larger MAC address, it becomes the decision maker of the ciphersuite. It compares $L_A$ with $L_B$ and selects any ciphersuite C such that $C \in L_A \cap L_B$. C will be for the ciphersuite used with this link instance with mesh point B.

In the second phase mesh point A and B may execute the following protocol to communicate and reach the agreement of the ciphersuite:

A chooses C and uses rng to generate a random number $R_A$
A→B: $MPA\|R_A\|\{C\}\|L_A\|m_K(MPA\|R_A\|\{C\}\|L_A)$
B uses rng to generate a random number $R_B$
B→A: $MPB\|R_B\|L_A\|L_B m_K(MPB\|R_B\|L_A\|L_B)$
B→A: $MPB\|MPA\|R_B\|R_A\|C\|L_B\|m_K(MPB\|MPA\|R_B\|R_A\|C\|L_B)$
A→B: $MPA\|MPB\|R_A\|R_B\|C\|L_A m_K(MPA\|MPB\|R_A\|R_B\|C\|L_A)$ Here, "$\|$" means concatenation, and A→B: M means mesh point A sends message M to mesh point B.

In the second phase mesh point A generates $R_A$ and sends message 1 (Decision Deliver Message), $MPA\|R_A\|\{C\}\|L_A m_K(MPA\|R_A\|\{C\}\|L_A)$, to mesh point B. Including MPA in message 1 tells mesh point B which authentication key to use to construct the response by message 3. Including $R_A$ in the message 1 allows mesh point A to later verify that message 3 is fresh, i.e., could not have been produced prior to message 1. Including $L_A$ in the message 1 allows mesh point B to verify that it received an authentic policy $L_A$ from mesh point A's earlier advertisement. This usage defends against forged advertisements.

Simultaneously or sequentially, mesh point B generates a random number $R_B$ and sends message 2 (Decision Acquire Message) as $MPB\|R_B\|L_A\|L_B\|m_K(MPB\|R_B\|L_A\|L_B)$. Similarly, mesh point B indicates the correct authentication key to use by including MPB in message 2. Including Rb in message 2 allows mesh point B to later verify that message 4 is fresh, i.e., could not have been produced prior to message 2. Including $L_B$ in the message 1 allows mesh point A to verify that B's earlier advertisement conveyed B's genuine policy $L_B$.

When mesh point B processes message 1, it uses K to check that the message authenticate code is valid. It also checks that $L_A$ in message 1 is consistent with the advertised ciphersuite list by mesh point A, and the ciphersuite C is also supported by mesh point B itself. Mesh point B then generates message 3 (Decision Confirm Message) to confirm the decision of C. Including both $R_B$ and $R_A$ in the message 3 allows mesh point A to verify that it is a fresh response. Similarly, mesh point A sends back message 4 (Decision Confirm Message) to verify that the agreement has been reached. At the end of the protocol, both mesh point A and mesh point B have committed to use C as the ciphersuite for securing this link instance between A and B.

Figure 3:
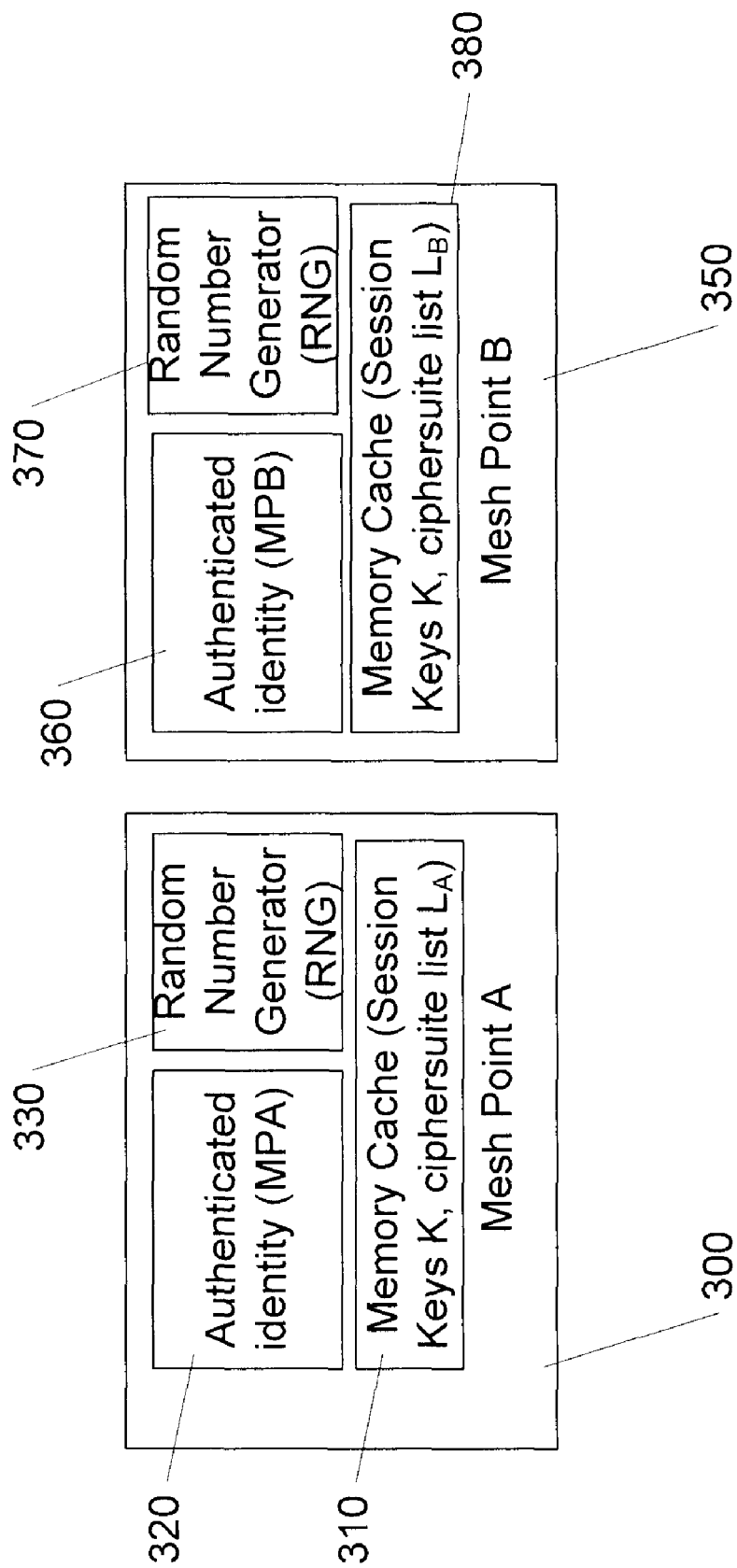
FIG. 3 is a block diagram of one embodiment of two mesh points that may communicate as described herein.

FIG. 3 is a block diagram of one embodiment of two mesh points that may communicate as described herein. Mesh point 300 and mesh point 350 may configured as part of a larger mesh network (not illustrated in FIG. 3) and may communicate utilizing any wireless protocol known in the art, for example, IEEE 802.11 standards.

Each mesh point may include a memory cache (310 and 380) that may be utilized to store cryptographic keys and/or ciphersuite information as described above. Each mesh point may also include a random number generator (330 and 370) that may be utilized to as described herein. The random number generator may be implements as hardware, software, firmware or any combination thereof. Each mesh point may further include an authenticated identity (320 and 360) that may be used for secure communications within the mesh network. Each mesh point may further include other components and/or elements, for example, a processor, a storage device, input/output devices, etc.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

What is claimed is:

1. A method for selecting security policies to be used between nodes of a mesh network, the method comprising:
   establishing a link between a local mesh network node and a remote mesh network node, wherein the link comprises a secure link based, at least in part, on an identifier corresponding to the local mesh network node and an identifier corresponding to the remote mesh network node;
   designating one of the local mesh network node and the remote mesh network node as a decision maker;
   determining, with the local mesh network node and the remote mesh network node, an intersection of security policies supported by the local mesh network node and the remote mesh network node;
   selecting one of the intersection of security policies for use in secure communications between the local mesh network node and the remote mesh network node, wherein selection of the security policy comprises exchanging four messages having authentication keys and pseudorandom numbers, wherein the four messages comprise overlays for ciphersuite negotiation on top of a mesh four message link establishment protocol, wherein selecting one of the intersection of security policies for use in secure communications between the local mesh network node and the remote mesh network node, wherein selection of the security policy comprises exchanging messages having authentication keys and pseudorandom numbers comprises:
   $A \rightarrow B: MPA\|R_A\|\{C\}\|L_A\|m_K(MPA\|R_A\|\{C\}\|L_A)$
   $B \rightarrow A: MPB\|R_B\|L_A\|L_B\|m_K(MPB\|R_B\|L_A\|L_B)$
   $B \rightarrow A: MPB\|MPA\|R_B\|R_A\|C\|L_B\|m_K$
   $(MPB\|MPA\|R_B\|R_A\|C\|L_B)$
   $A \rightarrow B: MPA\|MPB \quad \|R_A\|R_B\|C\|L_A\|m_K$
   $(MPA\|MPB\|R_A\|R_B\|C\|L_A)$
   where "$\|$" indicates concatenation, and $A \rightarrow B:M$ means mesh point A sends message M to mesh point B, "MPA" represents an identifier of mesh point A, "MPB" represents an identifier of mesh point B, "$L_A$" a list of ciphersuites supported by mesh point A, "$L_B$" a list of ciphersuites supported by mesh point B, "$m_K$" represents an authentication key, "$R_A$" is a random number generated by mesh point A, "$R_B$" is a random number generated by mesh point B, and "C" represents a chosen ciphersuite; and
   transmitting data between the local mesh network node and the remote mesh network node using the selected security policy, wherein transmitting data between the local mesh network node and the remote mesh network node using the selected security policy comprises IEEE 802.11i-compliant communications.

2. The method of claim 1 wherein the data transmitted between the local mesh network node and the remote mesh network node comprises streamed video.

3. The method of claim 1 wherein the identifier corresponding to local mesh network node comprises a Media Access Control (MAC) address of the local mesh network node and the identifier corresponding to the remote mesh network node comprises a MAC address of the remote mesh network node.

4. The method of claim 3 wherein designating one of the local mesh network node and the remote mesh network node as a decision maker comprises:
   comparing the MAC address of the local mesh network node and the MAC address of the remote mesh network node; and
   designating either the local mesh network node or the remote mesh network node based on the comparison.

5. An article comprising a tangible computer-readable medium having stored thereon instructions that, when executed by one or more processors, cause the one or more processors to:
   establish a link between a local mesh network node and a remote mesh network node, wherein the link comprises a secure link based, at least in part, on an identifier corresponding to the local mesh network node and an identifier corresponding to the remote mesh network node;
   designate one of the local mesh network node and the remote mesh network node as a decision maker;
   determine an intersection of security policies supported by the local mesh network node and the remote mesh network node;
   select one of the intersection of security policies for use in secure communications between the local mesh network node and the remote mesh network node, wherein selection of the security policy comprises exchanging messages having authentication keys and pseudorandom numbers, wherein four messages comprise overlays for ciphersuite negotiation on top of a mesh four message link establishment protocol, wherein selecting one of the intersection of security policies for use in secure communications between the local mesh network node and the remote mesh network node, wherein selection of the security policy comprises exchanging messages having authentication keys and pseudorandom numbers comprises:

$A \rightarrow B: MPA \| R_A \| \{C\} \| L_A \| m_K(MPA \| R_A \{C\} \| L_A)$
$B \rightarrow A: MPB \| R_B \| L_A \| L_B \| m_K(MPB \| R_{B\|LA} \| L_B)$
$B \rightarrow A: MPB \| MPA \| R_B \| R_A \| C \| L_B \| m_K(MPB \| MPA \| R_B \| R_A \| C \| L_B)$
$A \rightarrow B: MPA \| MPB \| R_A \| R_B \| C \| L_A \| m_K(MPA \| MPB \| R_A \| R_B \| C \| L_A)$ where "∥" indicates concatenation, and A→B:M means mesh point A sends message M to mesh point B, "MPA" represents an identifier of mesh point A, "MPB" represents an identifier of mesh point B, "$L_A$" a list of ciphersuites supported by mesh point A, "$L_B$" a list of ciphersuites supported by mesh point B, "$m_K$" represents an authentication key, "$R_A$" is a random number generated by mesh point A, "$R_B$" is a random number generated by mesh point B, and "C" represents a chosen ciphersuite; and transmit data between the local mesh network node and the remote mesh network node using the selected security policy, wherein transmitting data between the local mesh network node and the remote mesh network node using the selected security policy comprises IEEE 802.11i-compliant communications.

6. The article of claim 5 wherein the data transmitted between the local mesh network node and the remote mesh network node comprises streamed video.

7. The article of claim 6 wherein the identifier corresponding to local mesh network node comprises a Media Access Control (MAC) address of the local mesh network node and the identifier corresponding to the remote mesh network node comprises a MAC address of the remote mesh network node.

8. The article of claim 7 wherein the instructions that cause the one or more processors to designate one of the local mesh network node and the remote mesh network node as a decision maker comprise instructions that, when executed, cause the one or more processors to:

compare the MAC address of the local mesh network node and the MAC address of the remote mesh network node; and designate either the local mesh network node or the remote mesh network node based on the comparison.

* * * * *

UNITED STATES PATENT AND TRADEMARK OFFICE
CERTIFICATE OF CORRECTION

PATENT NO. : 8,037,510 B2
APPLICATION NO. : 11/857349
DATED : October 11, 2011
INVENTOR(S) : Walker et al.

It is certified that error appears in the above-identified patent and that said Letters Patent is hereby corrected as shown below:

In the Specification

In column 4, at line 49 delete, "$B \rightarrow A: \quad MPB \parallel MPA \parallel R_B \parallel R_A \parallel C \parallel L_B \parallel m_K (MPB \parallel MPA \parallel R_B \parallel R_A \parallel C \parallel L_B)$" and insert -- $B \rightarrow A: MPB \parallel MPA \parallel R_B \parallel R_A \parallel C \parallel L_B \parallel m_K (MPB \parallel MPA \parallel R_B \parallel R_A \parallel C \parallel L_B)$ --.

In column 4, at line 51 delete, "$A \rightarrow B: \quad MPA \parallel MPB \parallel R_A \parallel R_B \parallel C \parallel L_A m_K (MPA \parallel MPB \parallel R_A \parallel R_B \parallel C \parallel L_A)$" and insert -- $A \rightarrow B: MPA \parallel MPB \parallel R_A \parallel R_B \parallel C \parallel L_A \parallel m_K (MPA \parallel MPB \parallel R_A \parallel R_B \parallel C \parallel L_A)$ --.

In the Claims

In column 6, at line 12 delete, "$A \rightarrow B: MPA \parallel MPB \quad \parallel R_A \parallel R_B \parallel C \parallel L_A \parallel m_K (MPA \parallel MPB \parallel R_A \parallel R_B \parallel C \parallel L_A)$" and insert -- $A \rightarrow B: MPA \parallel MPB \parallel R_A \parallel R_B \parallel C \parallel L_A \parallel m_K (MPA \parallel MPB \parallel R_A \parallel R_B \parallel C \parallel L_A)$ --.

In column 7, at line 12 delete, "$A \rightarrow B: MPA \parallel MPB \quad \parallel R_A \parallel R_B \parallel C \parallel L_A \parallel m_K (MPA \parallel MPB \parallel R_A \parallel R_B \parallel C \parallel L_A)$" and insert -- $A \rightarrow B: MPA \parallel MPB \parallel R_A \parallel R_B \parallel C \parallel L_A \parallel m_K (MPA \parallel MPB \parallel R_A \parallel R_B \parallel C \parallel L_A)$ --.

Signed and Sealed this
Seventh Day of January, 2014

Margaret A. Focarino
*Commissioner for Patents of the United States Patent and Trademark Office*